A. L. CADÉ.
DEVICE FOR SECURING TIRES TO WHEEL RIMS.
APPLICATION FILED JAN. 28, 1910.

982,573.  Patented Jan. 24, 1911.

Witnesses:
H. A. Williams
Louis Conner

Inventor:
Auguste Louis Cadé
Attorney.

UNITED STATES PATENT OFFICE.

AUGUSTE LOUIS CADÉ, OF PARIS, FRANCE.

DEVICE FOR SECURING TIRES TO WHEEL-RIMS.

982,573.  Specification of Letters Patent.  Patented Jan. 24, 1911.

Application filed January 28, 1910. Serial No. 540,711.

*To all whom it may concern:*

Be it known that I, AUGUSTE LOUIS CADÉ, a citizen of the French Republic, and resident of Paris, France, have invented certain new and useful Improvements in Devices for Securing Tires to Wheel-Rims, of which the following is a specification.

This invention relates to a device for securing tires to wheel rims and more especially for securing in pneumatic tires the mantle of the tire to the wheel rim without it being necessary to use for this purpose the valve of the air tube as this was the case until now.

The great advantage resulting from the use of this securing device resides in the fact, that the valve and that part of the air tube which surrounds it, are no longer submitted to the strains resulting from the securing of the mantle to the wheel rim and consequently will last much longer and will no longer be a cause of leakage.

Furthermore the securing device which forms the subject matter of this invention, will dispense with the employment of the so called safety bolts in use until now.

Figure 1:
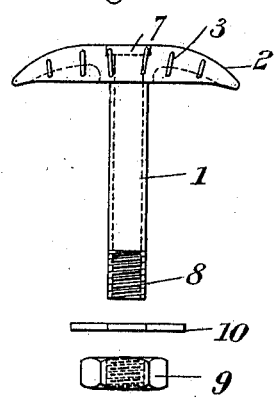
Figure 2:
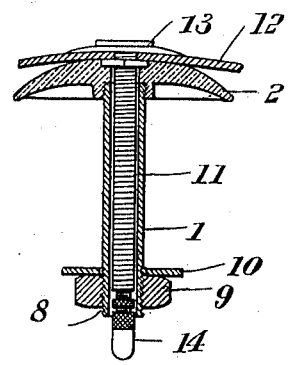
Figure 3:
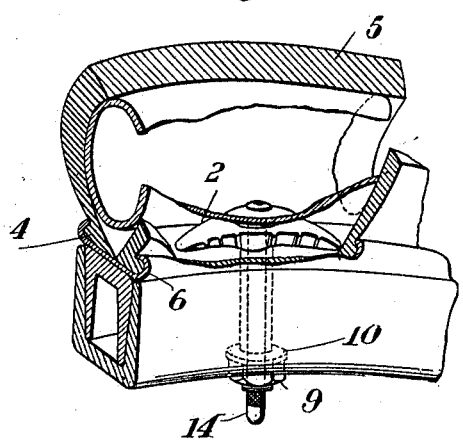

In the accompanying drawings: Figure 1 is a side elevation view of the securing device; Fig. 2 shows a longitudinal section of same while Fig. 3 is a perspective view with parts shown in section of a part of a wheel rim on which the tire has been secured by means of the securing device.

This securing device which is preferably made of metal comprises a tube 1 made integral at its upper end with a member 2 forming a head. This head, the lateral surfaces of which may be provided or not with ribs 3, has such a shape that it may easily engage the groove formed on the inside by the heels 4 of the mantle 5 of the pneumatic tire and thus press these heels against the edges of the wheel rim 6.

The head 2 is provided with a central depression 7 at the place where the passage of the tube 1 opens out. The end of the tube 1 which is positioned opposite the head 2, is provided with screw threads 8 intended to receive a nut 9 and one or more washers 10.

The tube 1 is intended to receive the valve 11 which is secured in the usual manner to the air tube 12 of the pneumatic tire and the securing nut 13 of which engages the depression 7 of the head 2. The length of the tube 1 is such that the end 14 of the valve 11 projects from the screw threaded end of the tube when the valve is in position in the latter.

When it is desired to fit the device to the wheel rim, one places the tube 1 on the valve attention being paid to the fact that the valve be in position in the said tube. When this operation is finished, the air tube is slightly inflated and is thereafter placed in its mantle. The whole is then put on the wheel and the tube 1 is placed into a hole provided to this end in the wheel rim. The washer or washers 10 are then slid over the projecting screw threaded end of the tube and finally the nut 9 is screwed on the same end without being tightened. When the wheel tire is entirely adjusted on the wheel and has been entirely inflated, the securing nut 9 is also tightened whereby the securing device is caused to descend and to cause the head 2 to exert a pressure on the inner surfaces of the mantle imprisoning the heels 4 of the latter without the valve being needed as a stop or as a bearing point for securing purposes. As the end of the valve freely projects from the tube 1 the inflation or deflation of the air tube can be carried out in the usual manner.

Having now fully described my said invention what I claim and desire to secure by Letters Patent is:—

1. In combination, a wheel rim formed with an opening and provided with inwardly extending flanges, a tire cover formed with ribs to fit against the inwardly extending flanges, a hollow securing device fitting in the opening in the rim and provided at one end with an elongated head which engages the opposite inner walls of the tire cover, said elongated head having in its outer end a seat for a valve stem, means on the outer end of the hollow securing device to clamp the latter to the rim and draw the head against the tire cover to force the ribs into engagement with the flanges.

2. A tire securing device comprising a tubular member, provided at one end with an elongated head which is curved in cross section and formed in its upper surface with a seat, the opposite end of the tubular member having threads, and a nut engaging the threads.

3. A tire securing device comprising a tubular member, provided at one end with an elongated head which is curved in cross section and formed in its upper surface with a seat, ribs on the curved surface of the head, the opposite end of the tubular member having threads, and a nut engaging said threads.

4. In combination, a wheel rim formed with an opening provided with inwardly extending flanges, a tire cover open at its inner edge and formed opposite thereto with ribs, a securing device fitting in the opening in the rim and comprising an elongated head which is curved in cross section, said elongated head having in its outer end a seat for a valve stem, a hollow stem projecting from the head and formed at its opposite end with screw threads, a nut engaging said threads to fasten the securing device in place, the tightening of the nut forcing the walls of the head against the free end of the cover to cause the ribs to engage under the inwardly extending flanges.

In testimony whereof I have hereunto set my hand in presence of two witnesses.

AUGUSTE LOUIS CADÉ.

Witnesses:
 H. C. COXE,
 JOHN BAKER.